US007040173B2

(12) United States Patent
Dehe

(10) Patent No.: US 7,040,173 B2
(45) Date of Patent: May 9, 2006

(54) PRESSURE SENSOR AND METHOD FOR OPERATING A PRESSURE SENSOR

(75) Inventor: Alfons Dehe, Neufahm (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/075,034

(22) Filed: Mar. 8, 2005

(65) Prior Publication Data

US 2005/0262947 A1 Dec. 1, 2005

(51) Int. Cl.
*G01L 7/00* (2006.01)
*G01L 9/12* (2006.01)

(52) U.S. Cl. .......................................... 73/706; 73/724

(58) Field of Classification Search .................. 73/706, 73/715–728, 756; 361/283.1, 283.2, 283.3, 361/283.4; 600/558; 428/349
See application file for complete search history.

(56) References Cited

U.S. PATENT DOCUMENTS 4,612,599 A * 9/1986 Ziegler .................... 361/283.1
4,993,072 A 2/1991 Murphy
5,189,914 A * 3/1993 White et al. .................. 73/599
6,312,393 B1 * 11/2001 Abreu ........................ 600/558
6,764,761 B1 * 7/2004 Eu et al. ..................... 428/349

FOREIGN PATENT DOCUMENTS

DE 33 25 966 A1 1/1984
DE 100 52 196 A1 8/2001
EP 1 244 332 A2 9/2002

OTHER PUBLICATIONS

"Introduction of Microphones", www.sonion.com, Rev 02, Sep. 2002, pp. 1-16 (16 pages).
www.knowlesacoustic.com/html/sil_mic.html, Dec. 18, 2003, (6 pages).
Torkkeli et al., "Capacitive Microphone with Low-Stress Polysilicon Membrane and High-Stress Polysilicon Backplate", Sensors and Actuators 85, Elsevier Science S.A., 2000, pp. 116-123, (8 pages).

* cited by examiner

*Primary Examiner*—William Oen
(74) *Attorney, Agent, or Firm*—Maginot, Moore & Beck

(57) ABSTRACT

A pressure sensor having a substrate, a counter-structure applied to the substrate, a dielectric on the counter-structure, a membrane on the dielectric, wherein the membrane or the counter-structure deflectable by a pressure applied, a protective structure, wherein the protective structure is isolated from the counter-structure or the membrane, wherein the protective structure is arranged with regard to the membrane or the counter-structure such that a capacity forms between the protective structure and the membrane or the protective structure and the counter-structure, and a provider for providing a potential at the protective structure differing from a potential at the counter-structure or the membrane.

20 Claims, 12 Drawing Sheets

PRESSURE SENSOR AND METHOD FOR OPERATING A PRESSURE SENSOR

CROSS-REFERENCE TO RELATED APPLICATION

This application claims priority form German Patent Application No. 10 2004 011 144.8, which was filed on Mar. 8, 2004, and is incorporated herein by reference in its entirety.

BACKGROUND OF THE INVENTION

1. Field of the Invention

The present invention relates to a pressure sensor and to a method for operating a pressure sensor.

2. Description of the Related Art

Pressure sensors are increasingly employed in technical devices. The conversion of an acoustic signal into an electrical signal is one of their tasks when they are, for example, formed as microphones. The increasing improvement in the processing of voice signals in means downstream of the microphones, such as, for example, digital signal processes, requires improving the characteristics of the microphones, since the quality of voice transmission is increasing continuously. Additionally, the ongoing miniaturization of devices, such as, for example, mobile telephones, requires the components, such as, for example, the microphones, employed there to be also reduced in size. Apart from that, the increasing pressure on the cost of these devices, such as, for example, mobile telephones or devices having voice recognition systems, requires further simplification of the manufacturing methods for microphones. A decisive advantage of Si microphones is their temperature stability. They can be set up in auto-insertion devices and be subjected to reflow soldering at temperatures of 260° C.

Altti Torkkeli and others, in their publication "Capacitive Microphone with low-stress polysilicon membrane and high-stress polysilicon backplate", from Sensors and Actuators (2000), describe a prior art microphone. The microphone includes a low-stress polysilicon membrane which is already deflected at a low sound pressure, and a perforated high-stress membrane which is only deflected at a high sound pressure. The two membranes are separated from each other by an air gap. The low-stress membrane changes its form with a sound pressure to be measured, whereas the form of the perforated high-stress membrane does not change. Thus, the capacity between the two membranes changes. The electrical isolation of the two membranes from each other is obtained by a silicon dioxide or a silicon nitride layer.

The company Knowles Acoustics, on its website www.knowlesacoustic.com/html/sil mic.html, offers microphones which are manufactured using polysilicon layers and can be mounted onto circuit boards in standardized manufacturing methods using pick and place machines.

The company Sonion, on its website www.sonion.com, offers miniaturized microphones, the width, length and height of which are each smaller than 5 mm.

The comparatively high capacity between substrate and membrane or counter-structure is a disadvantage of prior art microphones. The membrane structure is deflected by sound pressure variations, whereas the counter-structure remains in its position and is not deflected. Thus, the capacity between the electrodes changes. At the same time, the capacity portion formed of the fixed areas of the membrane structure and the counter-structure among each other and relative to the substrate, however, remains constant. The capacity of the microphone can consequently be symbolized by a parallel connection of two capacitors, of which a first capacitor formed by an electrode area between the edge area boundaries changes its capacity in dependence on the sound pressure. A second capacitor in this parallel connection formed by the electrode area to the left of the edge area boundary and to the right of the edge area boundary and by the capacities between the electrodes and the substrate, depends on an intensity of an incident sound. The overall capacity of the parallel connection varies only with a change in the capacity of the first capacitor. The proportional sensitivity, i.e. the capacity change relative to the overall capacity, divided by a change in sound pressure, is thus limited due to the high static capacity. A small ratio of the change in capacity to the overall capacity results in the requirement of a complicated signal processing. This, in turn, means that the signal processing stages downstream of the actual silicon microphone, due to the small ratio, are complicated and thus expensive and consume lots of chip area, which, in turn, limits the price reduction when manufacturing the microphone system of a silicon microphone having an integrated evaluation circuit in large numbers. In particular, the signal-noise ratio decreases with a decreasing active capacity.

SUMMARY OF THE INVENTION

It is an object of the present invention to provide a pressure sensor which can be integrated at low cost, and a method for operating the pressure sensor.

In accordance with a first aspect, the present invention a pressure sensor having a substrate, a counter-structure deposited onto the substrate, a dielectric on the counter-structure, a membrane on the dielectric, wherein the membrane or the counter-structure is deflectable by a pressure applied, a protective structure, wherein the protective structure is isolated from the counter-structure and the membrane, and wherein the protective structure is arranged relative to the membrane or the counter-structure such that a capacity is formed between the protective structure and the membrane or the protective structure and the counter-structure, and means for providing a potential at the protective structure differing from a potential at the counter-structure or the membrane.

In accordance with a second aspect, the present invention provides a method for operating a pressure sensor having: a substrate; a counter-structure applied to the substrate; a dielectric on the counter-structure; a membrane on the dielectric, the membrane or the counter-structure being deflectable by a pressure applied; and a protective structure arranged with regard to the membrane such that a capacity forms between the protective structure and the member or the protective structure and the counter-structure; having a step of applying a potential to the protective structure differing from a potential of the counter-structure or the membrane.

The central concept of the present invention is to mount, in addition to a membrane and a counter-structure, a protective structure which is at a potential differing from a potential of the membrane or the counter-structure and thus serves to fade out a component of the static capacity. Consequently, the static capacity is also determined by the capacity between the membrane or the counter-structure and the substrate. The capacity between the membrane or the counter-structure and the substrate can be represented by a series connection of a first capacity between the membrane or the counter-structure and the protective structure and a second capacity between the protective structure and the substrate. The overall capacity of the series connection is reduced by fading out the first capacity.

The improved sensitivity of the pressure sensor resulting from the reduction of the static capacity obtained is an advantage of the invention. This improved sensitivity results in a reduction in complexity of signal processing units downstream of the microphone.

The advantages of this reduction in complexity are a low chip area of the entire pressure sensor system, the system of the actual pressure sensor and the circuit for evaluating a pressure sensor signal, an increased manufacturing yield and accompanying cost reduction for manufacturing the pressure sensor system connected thereto.

The complexity for testing the pressure sensor is also diminished by the increased sensitivity thereof.

In a preferred embodiment, the membrane comprises passages so that it only responds to dynamic pressure but not to static pressure.

BRIEF DESCRIPTION OF THE DRAWINGS

Preferred embodiments of the present invention will be detailed subsequently referring to the appended drawings, in which.

DESCRIPTION OF PREFERRED EMBODIMENTS

Figure 8:
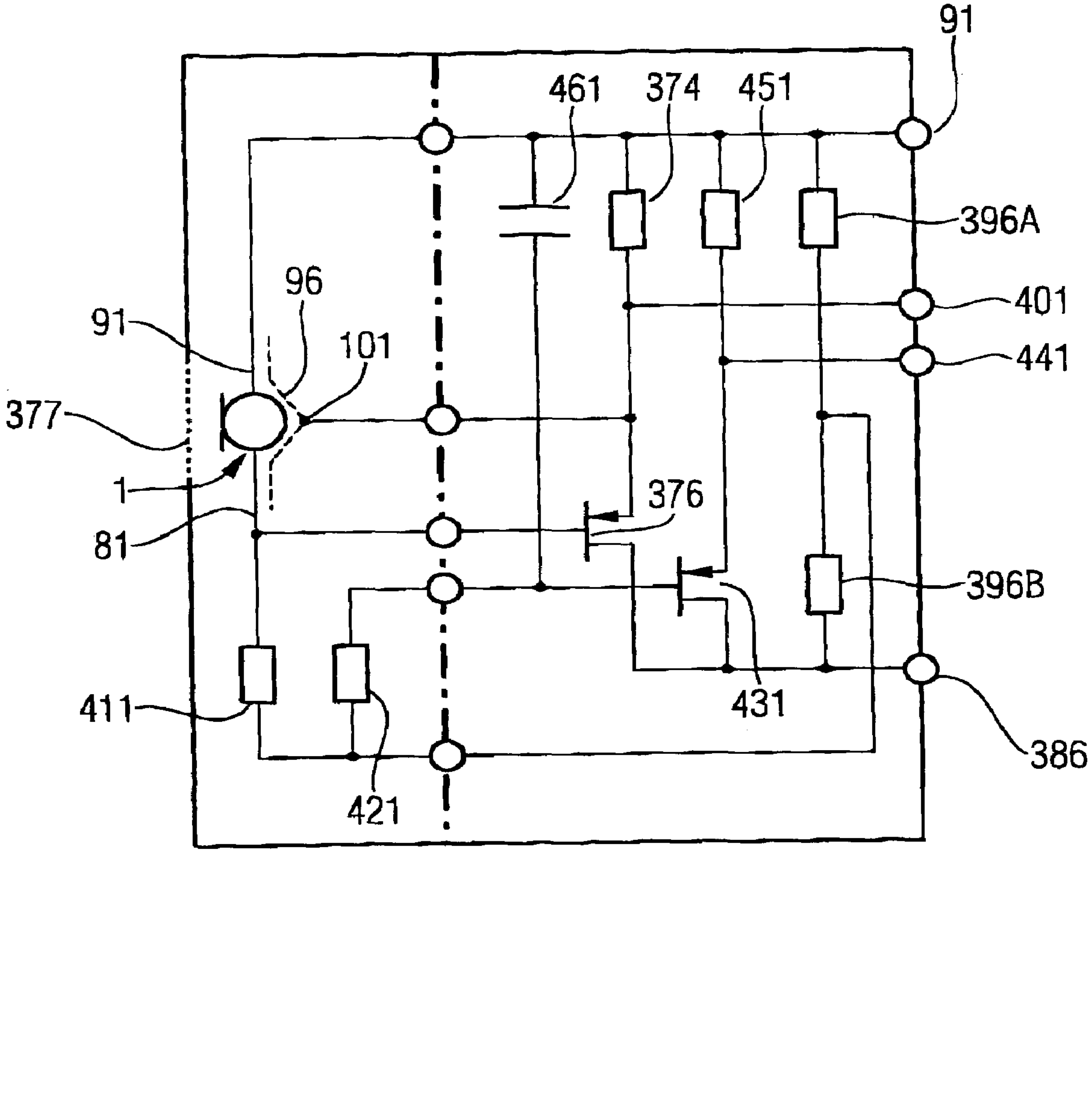
FIG. 8 shows an embodiment of the present invention.

FIG. 8 shows an embodiment of a pressure sensor according to the present invention. A pressure sensor 1 can be seen there. The pressure sensor comprises a membrane terminal 81, a counter-structure terminal 91, a guard ring 96 which is only shown schematically here, and a guard ring terminal 101.

A change in pressure coming from outside, resulting in a deflection of a membrane structure 11 which will be explained below, enters via a pressure inlet hole 377. The deflection of the membrane structure 11 results in a change in capacity of the capacity between the membrane terminal 81 and the counter-structure terminal 91.

A constant direct voltage is applied to the counter-structure terminal 91 and a ground terminal 386. The voltage divider 396*a*, 396*b* results in setting the operating point of the pressure sensor assembly, the potential for the operating point being tapped exactly between the two voltage divider resistors 396*a*, 396*b*.

A change in the capacity between the counter-structure terminal 91 and the membrane terminal 81 results in a change in the current through the output resistor 411 and thus in a voltage change at the membrane terminal 81. This potential change at the membrane terminal 81 has the effect of altering the input voltage of the impedance converter 376.

In a connection including the series resistor 374, the transistor 376 serves as the impedance converter 376 and, together with the series resistor 374, forms a voltage divider for the overall voltage at a counter-structure terminal 91 and the ground potential terminal 386. A change in the input potential of the impedance converter 376, which is at the potential of the membrane terminal 81, results in a change in the current through it, resulting in a change in the output signal potential 401. The changing current through the impedance converter 376 and the series resistor 374 remaining constant results in a change in the voltage drop at the constant series resistor 374 and thus in a change in the potential at the output 401. Thus, the output signal potential 401 depends on the capacity at the pressure sensor 1. Since the output signal potential 401 is connected to the guard ring terminal 101 in an electrically conducting way, the guard ring 96 will always be at the potential of the output signal 401.

It is decisive here for the guard ring 96 to be galvanically separated from the membrane terminal 81. In this circuit, the voltage at the guard ring 96 is set such that it corresponds to the voltage at the membrane terminal 81.

The transistor 431, too, serves as an impedance converter which is set via the input resistor 421 and the series resistor 451 but does not receive a signal. Typically, it is set in a similar way to the impedance converter 376 so that the potential at a reference output 441 corresponds to a direct portion of the output signal potential 401. A difference signal of the output signal potential 401 and the reference signal 441 consequently corresponds to an output signal potential 401 reduced in its offset portions. Thus, the potential at the reference output serves to compensate the direct signal portion in the output signal potential 401. The difference signal of the output signal potential 401 and the reference signal 441 can be processed more easily by downstream signal processing units.

Since the output signal potential 401 is also applied to the guard ring 96 and, in this circuit, set such that it corresponds to the potential at the membrane terminal 81, the guard ring 96 is at the potential of the membrane 81. Consequently, the guard ring 96 serves as a protective structure and supports fading out a static capacity of the membrane with regard to the substrate.

At the same time, the membrane structure terminal 81 and the guard ring 96 are, however, separated from each other galvanically.

Figure 6:
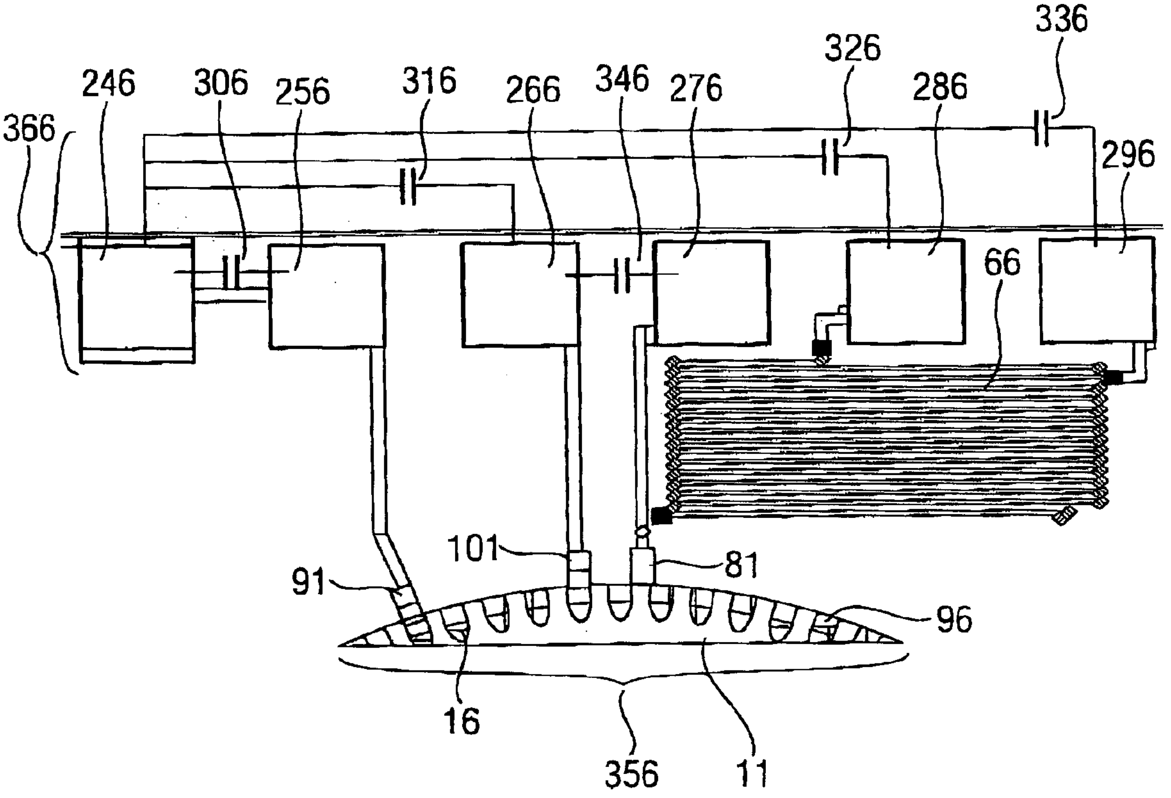
FIG. 6 shows an equivalent circuit of an embodiment of the present invention.

FIG. 6 explains an equivalent circuit of a pressure sensor according to an embodiment of the present invention. Illustrated are a pressure sensor portion 356 and a corresponding equivalent circuit 366. The pressure sensor portion shows the membrane 11, the counter-structure 16, the guard ring 96, the counter-structure terminal 91, the membrane terminal 81 and the guard ring terminal 101.

The equivalent circuit includes a substrate potential 246, a counter-structure potential 256, a guard ring potential 266, a first membrane potential 276, a second membrane potential 286 and a third membrane potential 296. Here, the respective potentials are illustrated as plates.

Capacities form between the potential plates 246, 256, 266, 276, 286, 296. Thus, the counter-structure capacity 306 is between the ground potential plate 246 and the counter-structure 256, the guard ring capacity 316 is between the guard ring 266 and ground 246 and the first membrane capacity 346 is between the guard ring 266 and the membrane 276. Furthermore, the second membrane capacity 326 and the third membrane capacity 336 are between the taps 286, 296 at the resistor layers 66 and ground 246, respectively.

The potential 266 of the guard ring 101 is, by means of a means for providing a potential of a protective structure 266, the switching means being explained in FIG. 8, is kept at the same value as the potential 276 of the membrane 81.

Consequently, there is no voltage at the capacity 376 between the membrane 11 and the guard ring 96. The guard ring 96 surrounding the counter-structure 16 diminishes a capacity between a membrane 11 and the substrate not shown here. The capacity between the substrate plate 246 and the membrane plate 276, which, in this equivalent circuit 366, symbolize the potentials, is formed by a series connection of a first capacity 316 between the guard ring 96 and the substrate and a second capacity 346 between the guard ring 96 and the membrane 11.

If the guard ring 96 is brought to a potential of the membrane 11, this will correspond to fading out the capacity 346 and thus reducing the overall capacity of the series connection of the capacities 316 and 346, since the overall capacity of a series connection is determined by the capacity value of the smaller circuit.

Figure 7:
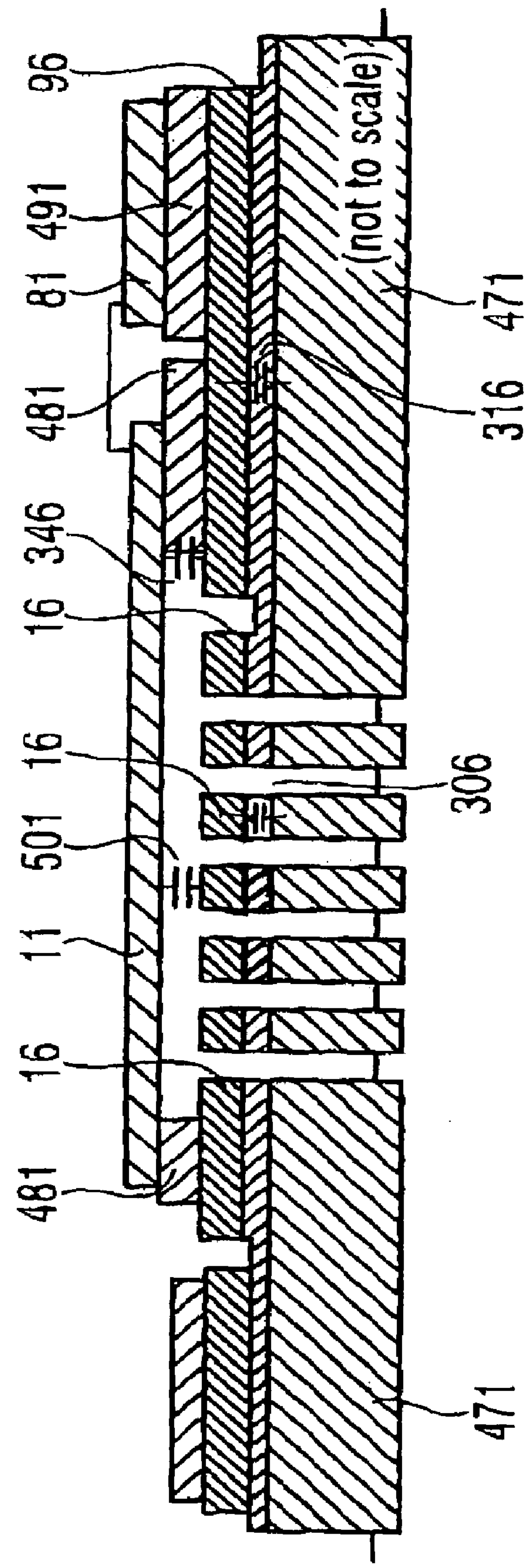
FIG. 7 shows an explanatory illustration of the multi-layered setup and the equivalent circuit in the embodiment of the present invention.

FIG. 7 shows an embodiment of a pressure sensor of the present invention. The pressure sensor includes the membrane structure 11, the counter-structure 16, the membrane terminal 81, the guard ring 96, a substrate 471, a dielectric 481 and an isolation layer 491. FIG. 7 describes the arrangement of the elements in a multi-layered setup and the capacities forming between the different layers.

The membrane structure terminal 81 is electrically isolated from the guard ring 96 by the isolation layer 491. The pressure sensor capacity 501 is between the membrane 11 and the counter-structure 16. It basically depends on the area of the overlapping membrane 11 and counter-structure 16 and the spacing of the two electrodes from each other. The membrane guard ring capacity 346 between the membrane 11 and the guard ring 96 forms by the overlapping areas between the membrane 11 and the guard ring 96. The guard ring capacity 316 forms between the substrate 471 and the guard ring 96 and the counter-structure capacity 306 forms between the area of the substrate 471 and the area of the counter-structure 16. The arrangement in FIG. 7 can again be symbolized by the equivalent circuit 366 shown in FIG. 6.

Figure 9:
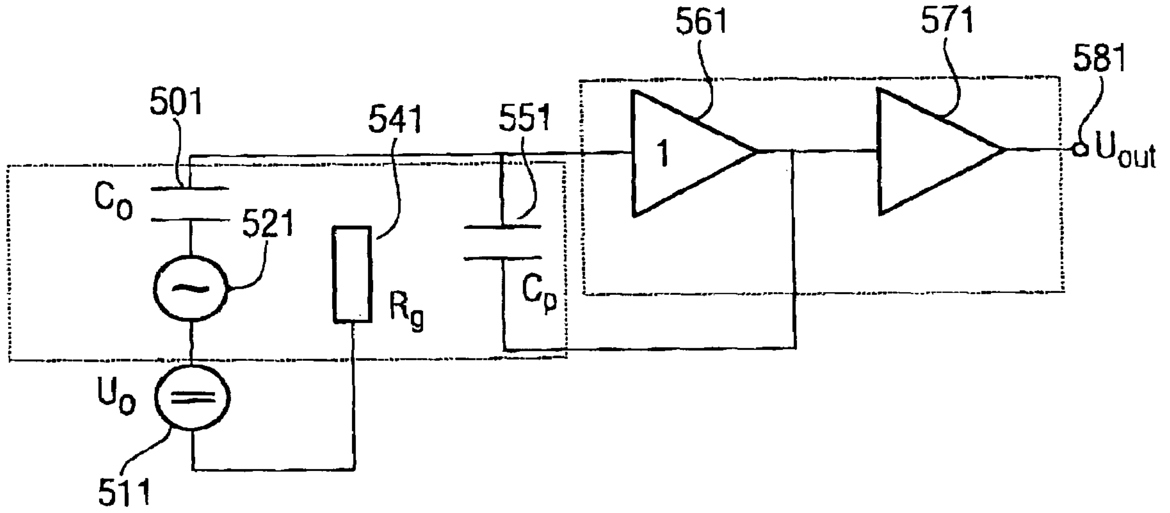
FIG. 9 is a basic sketch of an embodiment of the present invention.

FIG. 9 explains the fundamental mode of operation of the pressure sensor according to an embodiment of the present invention. The pressure sensor is connected to a direct voltage source 511 and comprises a capacity 501 and an overall resistor 541.

An alternating voltage symbolized by the alternating voltage source 521 is the result of the changes in the capacity between the membrane 11 and the counter-structure 16. The amount of the alternating voltage amplitude thus depends on the deflection of the membrane 11.

The voltage drop at the overall resistor 541 is at an input of a downstream impedance converter element 561 which is often formed as a unity amplifier having an amplification smaller than one and preferably close to one, the typical values being between 0.6 and 0.9. The output of the impedance converter element 561 is fed back to the input of the impedance converter element via the parasitic capacity 551 of the pressure sensor 1, which is mainly formed by the membrane guard ring capacity. By feeding back the output signal to the parasitic capacity, recharging thereof and thus loading of the signal are reduced. Recesses are formed in the counter-structure 16 and the membrane 11 to further reduce the parasitic capacity. The signal processing circuit 571 filters and amplifies the output signal before the output signal is tapped at the output 581.

Figure 1:
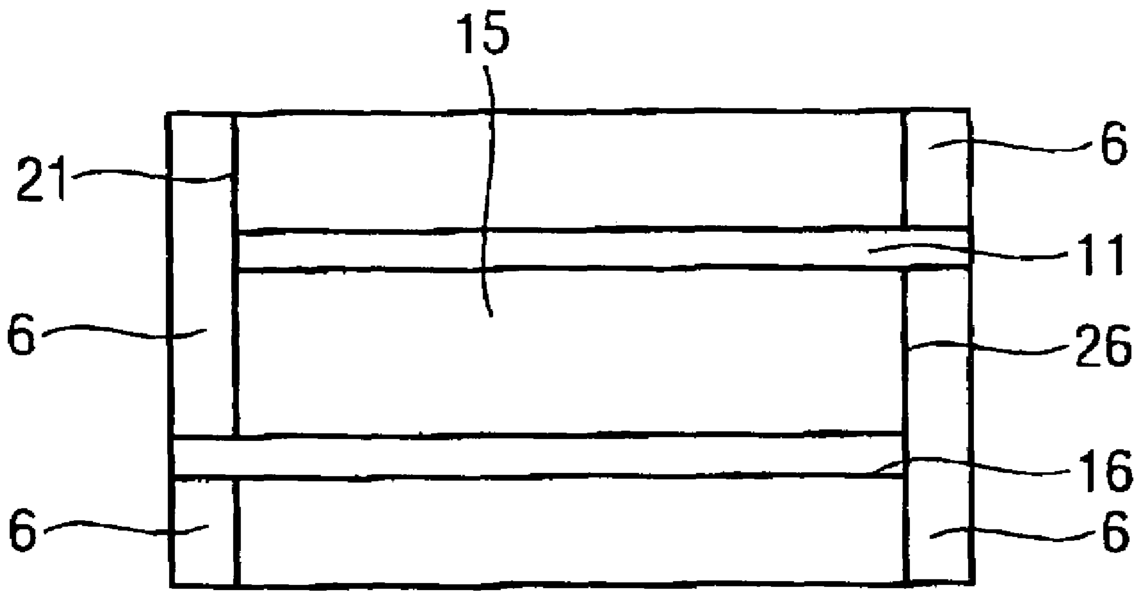
FIG. 1 shows a schematic cross-sectional illustration of the pressure sensor according to an embodiment of the present invention.

FIG. 1 shows an embodiment of the present invention. Illustrated are a membrane support 6, the membrane structure 11, an air gap 15 between the membrane structure 11 and the counter-structure 16, a left edge region boundary 21 and a right edge region boundary 26. Membrane structure 11 is fixed in the membrane support 6 to the right of the edge region boundary 26 and has a recess at the left edge region boundary 21. The counter-structure 16 is fixed in the membrane support 6 to the left of the edge region boundary 21 and has a recess at the right edge region boundary 26. The pressure sensor according to an embodiment of the present invention comprises recesses in the membrane structure 11 and the counter-structure 16 in the edge region of the membrane structure, i.e. to the left of the edge region boundary 21 and to the right of the edge region boundary 26. Thus, the membrane structure 11 and the counter-structure 16 do not overlap in the edge region. This is how, in the parallel connection of the capacity of the sensor and the parasitic capacity, the parasitic capacity formed by the overlapping of the membrane structure 11 and the counter-structure 16 in the edge region, is eliminated. The sensitivity of the microphone body 1, i.e. the proportional change in capacity of the capacitive assembly when a sound impinges on the membrane structure, increases.

Additionally, a protective structure is deposited between the counter-structure 16 and the membrane support 6 around the counter-structure 16, which is not illustrated here. The protective structure is brought to a potential differing from that of the counter-structure by means not shown here, which fades out a part of the capacity between the membrane support 6 and the counter-structure 16.

Figure 2A:
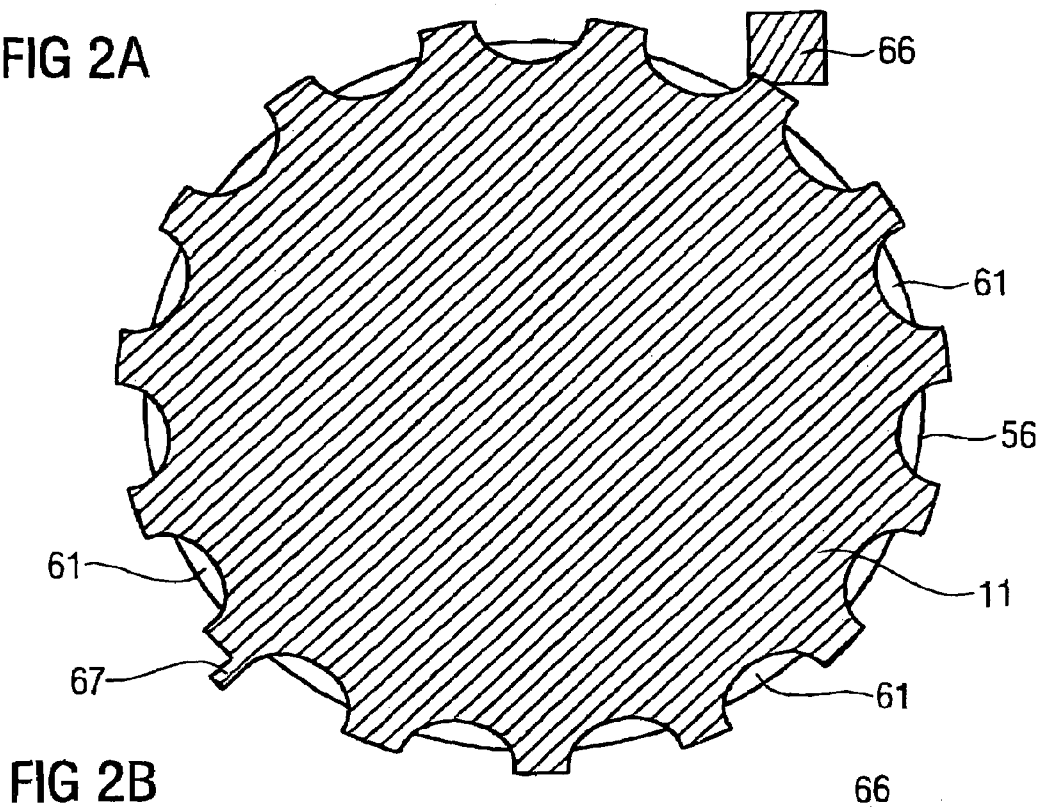
FIG. 2*a* shows a membrane structure of another embodiment of the present invention.

FIG. 2*a* shows another embodiment of the present invention by illustrating the structure of a membrane in a front view. Illustrated are the membrane structure 11, an edge region boundary 56, recesses 61 in the membrane structure 11, a resistor layer 66 and a terminal of the membrane structure 67. As will be discussed in the following FIGS. 2*b* and 2*c*, the recesses 61 are arranged such that the overlappings between the membrane structure 11 and the counter-structure 16 in the embodiment of this microphone are reduced outside the circular edge region boundary 56.

Figure 2B:
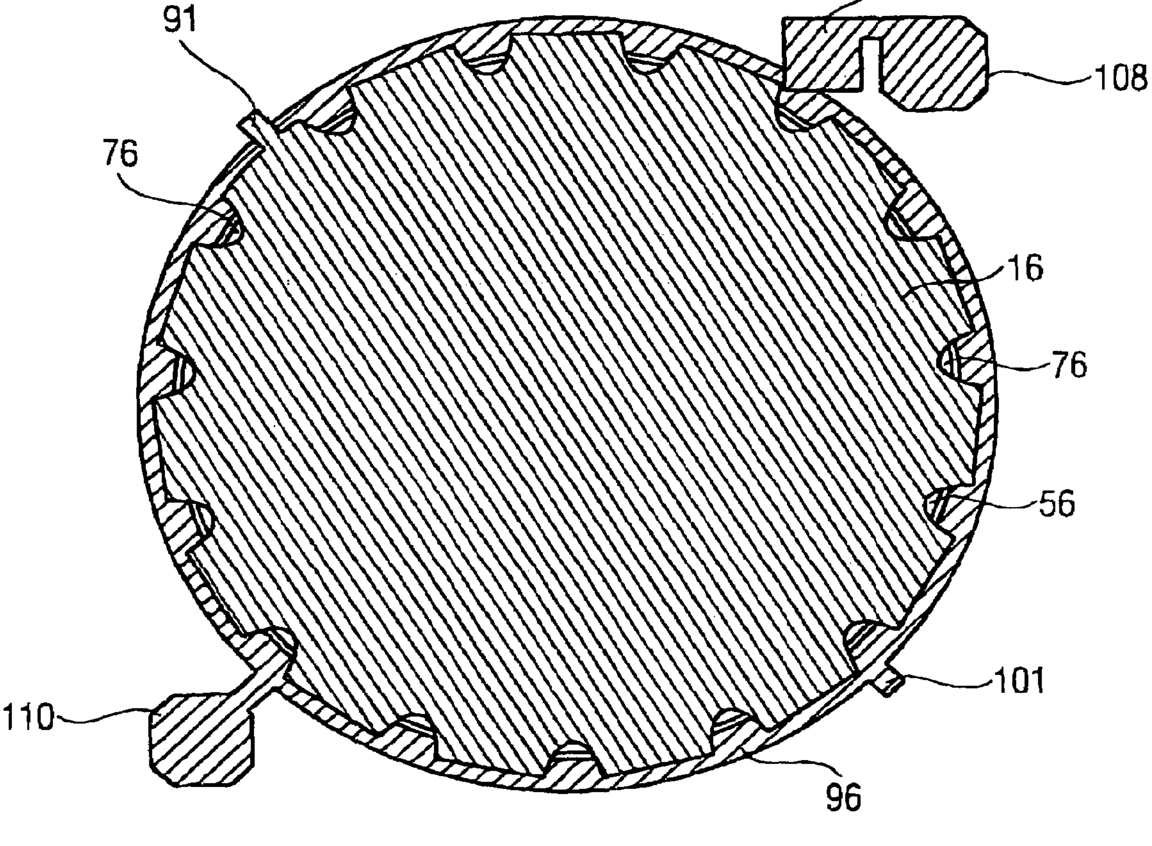
FIG. 2*b* shows a counter-structure of an embodiment of the present invention.

FIG. 2*b* explains the arrangement of the counter-structure 16. Illustrated are the counter-structure 16, the edge region boundary 56, recesses 76 of the counter-structure 16, the terminal 91 for the counter-structure 16, the guard ring 96, the terminal 101 for the guard ring 96 and a contact 108 for the membrane structure 11 via the precharge resistor 66. The recesses in the counter-structure 16 are arranged such that the area overlapping the membrane structure 11 is reduced, which diminishes parasitic capacities. The guard ring 96 arranged in the counter-structure layer is at a potential differing from that on the counter-structure 16 and thus additionally shields the parasitic capacity forming in the edge region, i.e. outside the circle 56, between the membrane structure 11 and the substrate, which is not shown here. Since the guard ring 96 is in the same layer as the counter-structure 16 and is to fade out to the best extent possible, the guard ring 96 comprises different widths, a small width in regions where it is opposite to a land of the counter-structure, and a great width in regions where it is opposite to a recess 76 of the counter-structure 16.

Figure 2C:
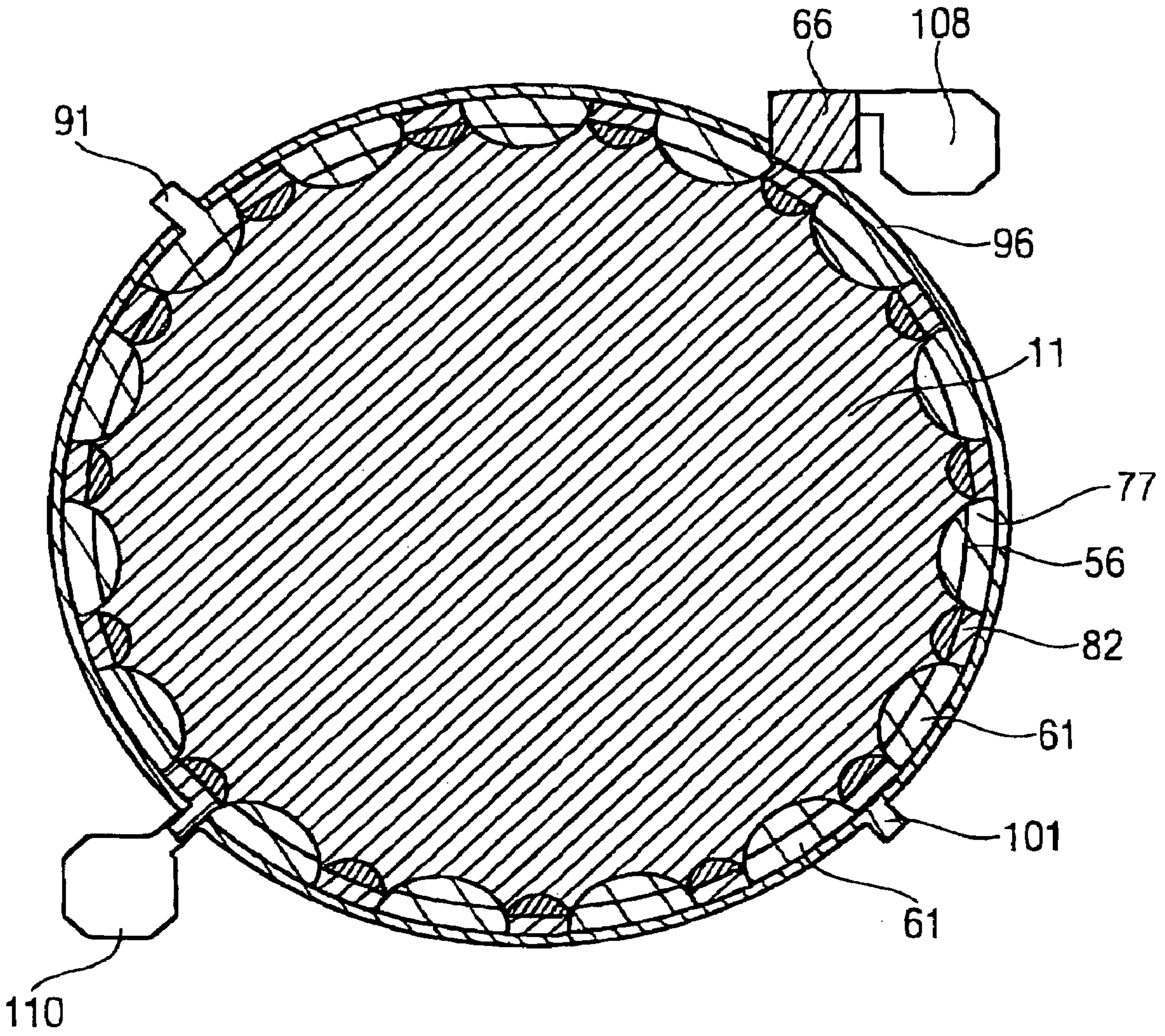
FIG. 2*c* shows a top view of a microphone with illustrated overlappings.

FIG. 2*c* shows a top view of the membrane, wherein a schematic setup of the microphone according to an embodiment of the present invention is illustrated here, since now both the membrane structure 11 and the overlappings with recesses 76 of the counter-structure 16 are illustrated. Parts of these overlappings would normally not be visible but are illustrated for a better understanding. Illustrated are the membrane structure 11, the edge region boundary 56, the recesses in the membrane structure 61, the resistor layer 66, areas 77 of the membrane structure 11 opposite the recesses 76 of the counter-structure 16, the counter-structure terminal 91, the guard ring 96, the guard ring terminal 101, a contact 108 at the resistor layer 66 and a membrane contact 110. The recesses in the membrane structure 61 and the regions 77 of the membrane structure 11, which are opposite the recesses 56 in the counter-structure 16, are arranged such that the area overlappings between the membrane structure 11 and the counter-structure 16 are reduced compared to an arrangement without recesses. The guard ring 96, in turn, is at a potential differing from that on the counter-structure 16 and thus additionally contributes to shielding the parasitic static capacities. In particular, the potential to which the guard ring 96 is brought, is between the potential of the membrane structure 11 and the counter-structure 16 and preferably at the membrane potential.

Figure 3A:
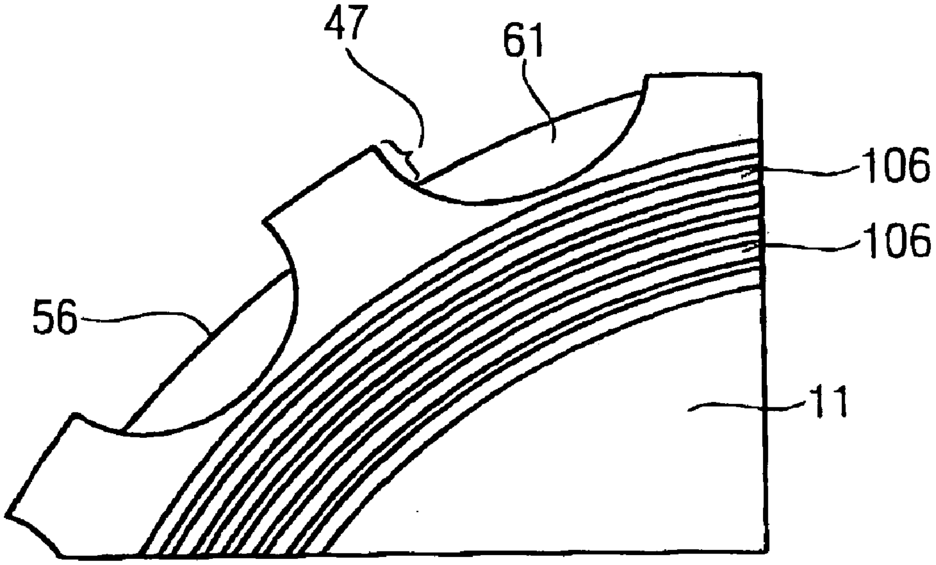
FIG. 3*a* shows an enlarged illustration of the membrane structure of the embodiment of FIGS. 2*a–c;*

FIG. 3*a* shows an enlarged illustration of the membrane structure 11 of the microphone 1 which is designed on the embodiment explained in FIGS. 2*a–c* according to the concepts of the present invention. Shown are the membrane structure 11, a land length 47 of the membrane structure 11, the edge region boundary 56, recesses 61 in the membrane structure 11 and corrugation grooves 106. In this embodiment, 6 corrugation grooves are inserted into the membrane structure 11, wherein, however, any other number of corrugation grooves, preferably between 3 and 20 may be present in the membrane structure 11. It is the task of the corrugation grooves to reduce the mechanical stress in the membrane layer subjected to tensile stress. Thus, greater overall deflections are possible. A membrane performance, however, will remain, the deflection line of a membrane also remaining. The recesses in the membrane structure 61 outside the area surrounded by the corrugation grooves have the function of reducing the overlapping of the membrane structure 11 and the counter-structure 16 in the edge region of the membrane structure 11.

Figure 3B:
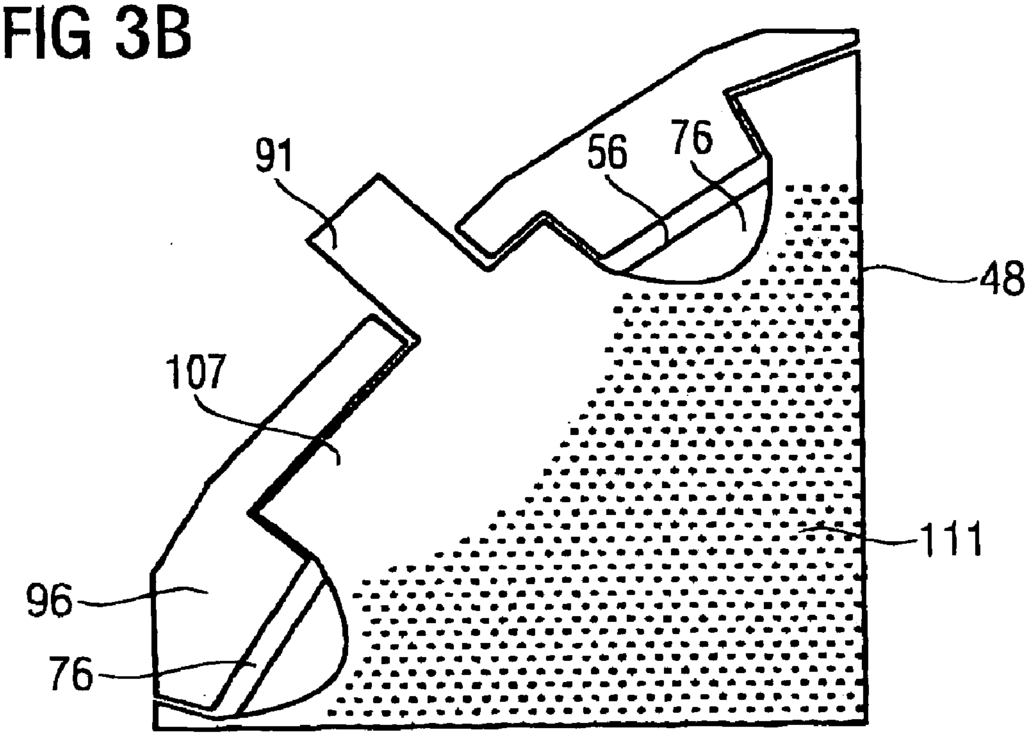
FIG. 3*b* shows an enlarged illustration of the counter-structure of the embodiment of FIGS. 2*a–c;*

An enlarged illustration of the arrangement of the counter-structure 16 is illustrated in FIG. 3*b*. A land length 48 of the counter-structure 16, the edge region boundary 56, the recesses 76 in the counter-structure 16, the terminal for the counter-structure 91, the guard ring 96, a counter-structure region 107 opposite to a recess 61 in the membrane structure 11, and a counter-structure region 111 opposite to a region of the membrane structure 11 where there are no recesses, are shown in this illustration. The land length 48 of the counter-structure 16 extends from the edge region boundary to an outer end of the land of the counter-structure 16.

Thus, the guard ring 96 is at a potential differing from the counter-structure 16, resulting in the electrical field resulting therefrom to contribute to shielding the parasitic capacities in the edge region. The recesses 76 and the counter-structure 16 which are opposite the region in the membrane structure 11 where there are no recesses, also contribute to reducing the parasitic capacities. Apart from that, this figure also shows that a recess opposite a region of the counter-structure 16 where there are no recesses, is present in the membrane structure 11 in the edge region, since the counter-structure 11 in this region is fixed to the membrane support 6 for mechanical stabilization.

Figure 3C:
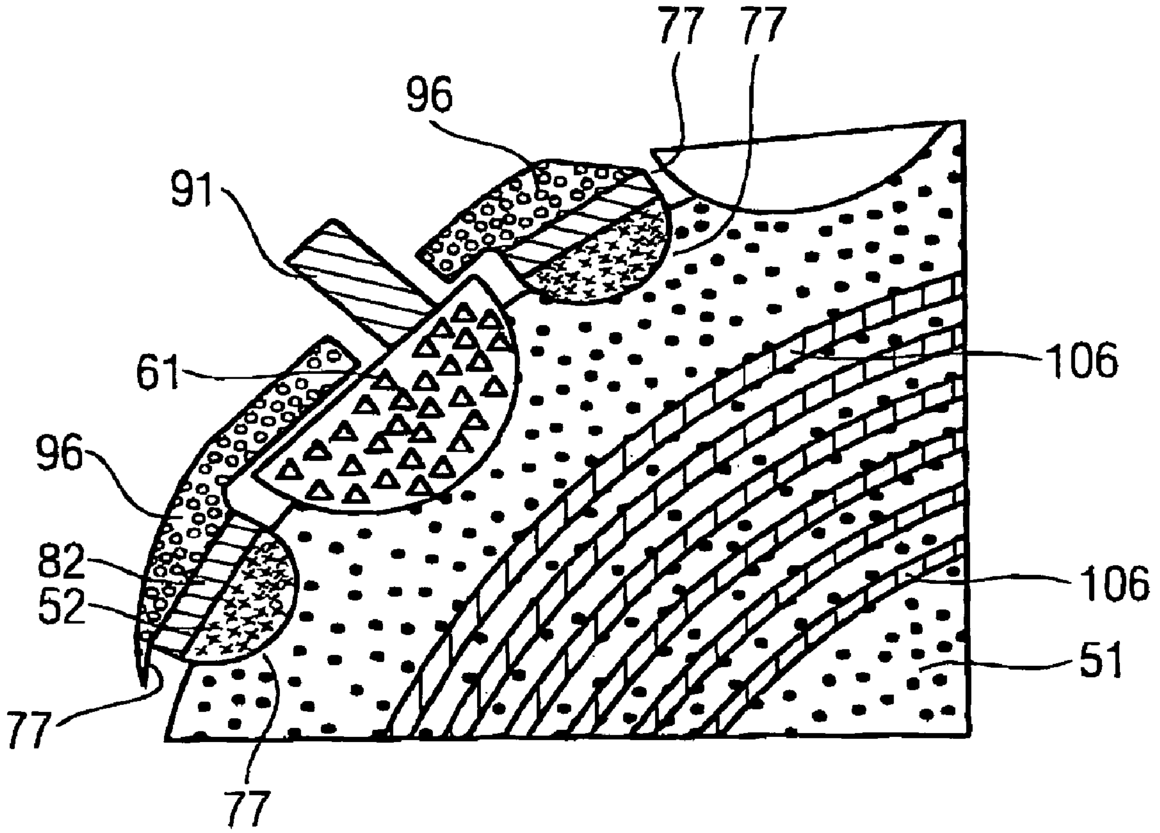
FIG. 3*c* shows an enlarged illustration of the membrane structure and the counter-structure of the microphone of the embodiment of FIGS. 2*a–c;*

FIG. 3*c* shows an enlarged general front view of the membrane structure 11 and thus an enlarged portion of an embodiment according to the present invention and again illustrates the overlappings between the membrane 11 and the counter-structure 16. These overlappings are, in analogy to the view of FIG. 2*c*, actually partly not visible, but are illustrated for explaining purposes. Illustrated are an overlapping 51 of the membrane structure 11 and the counter-structure 16, the recesses 61 in the membrane structure 11, a membrane region 77 opposite to recesses 76 in the counter-structure 16, the counter-structure terminal 91, the guard ring 96 and the corrugation grooves 106. The membrane region 77 which is opposite to recesses 76 in the counter-structure 16 is composed of two areas, namely of areas 82 opposite the guard ring 96 and of areas 52 not opposite the guard ring 96. The overlapping areas between the membrane structure 11 and the counter-structure 16 are reduced in the edge regions and the parasitic capacities which are mainly in the edge region are additionally shielded via the guard ring 96, which is preferably provided. The static capacity thus only forms between the offset lands of the membrane structure 11 and the counter-structure 16. Consequently, the fixed capacity is diminished to 5% of the original value of an arrangement without recesses by this inclined arrangement of the capacitor plates. The mechanical stability of the arrangement having recesses in the membrane 11 and the counter-structure 16 is reduced compared to an arrangement without recesses. The reduction in stability can be compensated by a higher counter-structure layer thickness.

The membrane structure 11 is thus deflected over the entire area, even beyond the corrugation grooves at the lands. The exact deflection line deviates somewhat from that of a circular membrane. The essential purpose of the corrugation grooves 106 is to at least partly relax the layer tensile stress in the membrane structure 11, wherein a typical membrane performance of the membrane structure 11 continues to be present.

Figure 4:
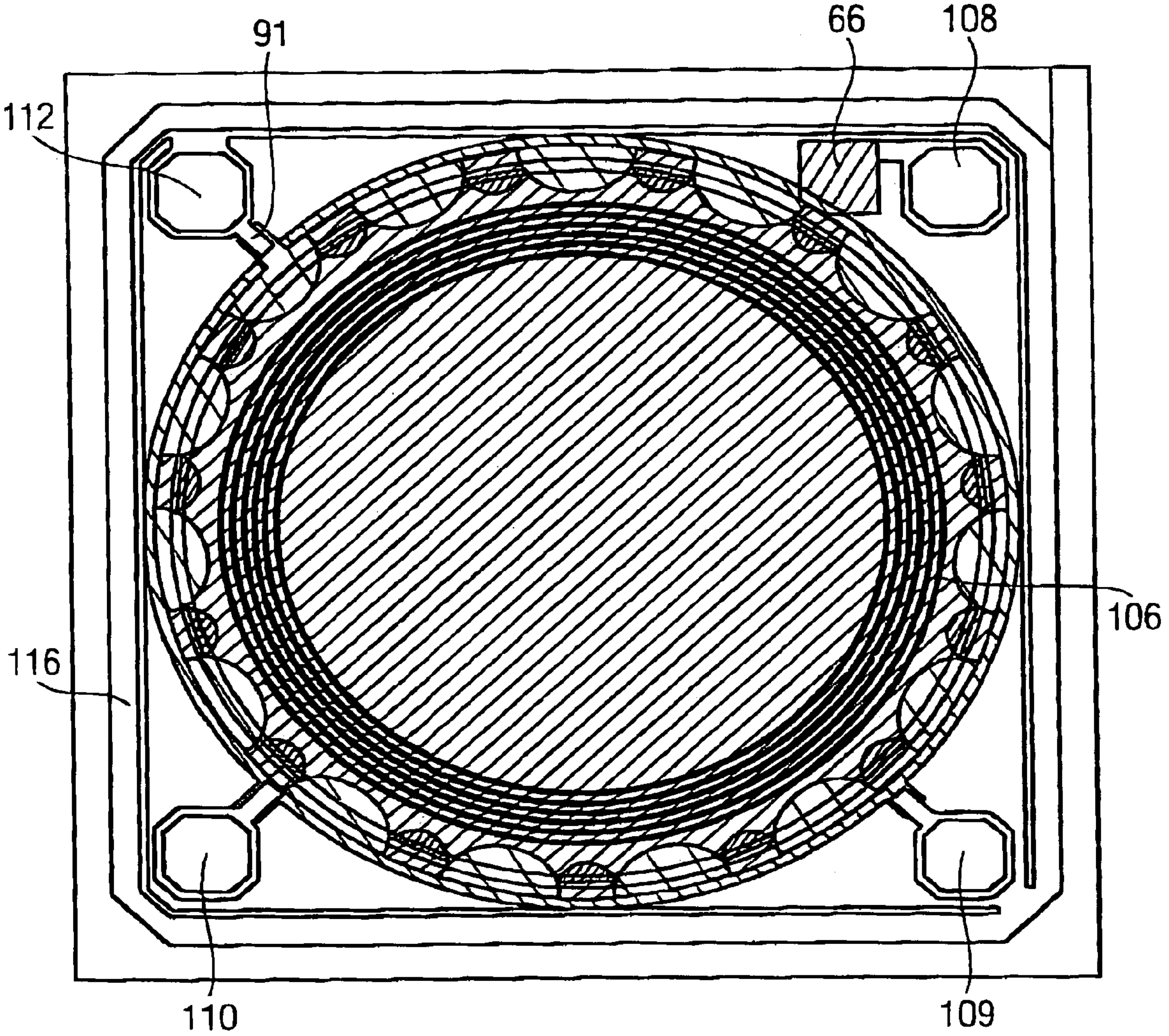
FIG. 4 shows an illustration of the entire microphone body of the embodiment of the present invention.

FIG. 4 shows a general view of the arrangement illustrated in FIG. 2*c*, wherein the corrugation grooves 106, a resistor contacting 108, a guard ring contacting 109, a membrane contacting 110 and a substrate contacting 112 are also illustrated in this overall arrangement. The overall arrangement of FIG. 2*c* having the contactings 108, 109, 110, 112 resides in a microphone body frame 116. The substrate contacting 112 is conductively connected to the terminal 91 for the counter-structure 16. The counter-structure 16 thus is at the same potential as a substrate of the microphone. The resistor contacting 108 is conductively connected to the membrane structure 11 via the resistor layer 66. The guard ring contacting 109 is conductively connected to the guard ring 96, whereas the membrane contacting 110 is connected to the membrane structure 11.

FIGS. 5*a–h* show a method for manufacturing a pressure sensor according to an embodiment of the present invention.

Figure 5A:
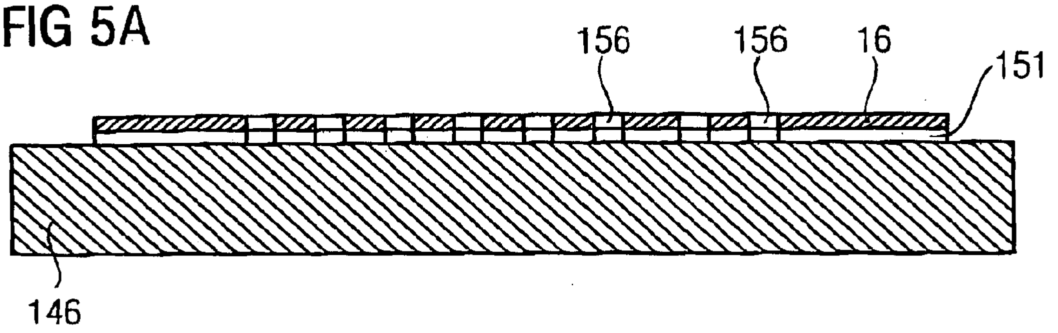
FIGS. 5*a–h* show a method for manufacturing an embodiment of a microphone according to the present invention.

FIG. 5*a* shows a substrate 146 onto which an etch stop layer 151 is deposited, onto which in turn the counter-structure layer 16 is deposited. This counter-structure layer 16, at this state of the manufacturing process, also includes the protective structure to be formed as a guard ring. Holes 156 and recesses between the guard ring 96 and the counter structure 16 are exposed by means of etching in the counter-structure layer 16.

Figure 5B:
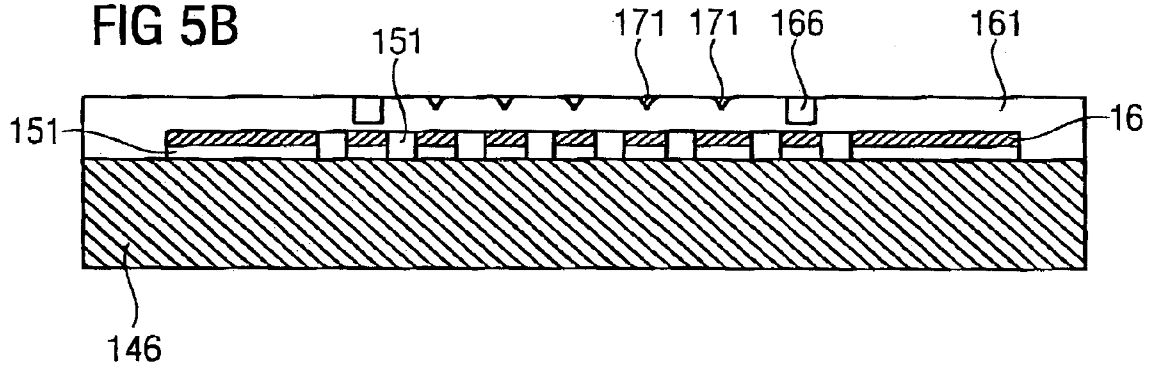
Figure 5C:
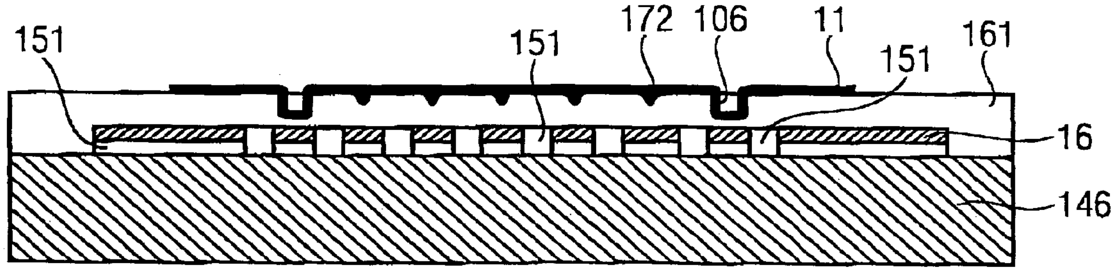

Subsequently, as is illustrated in FIG. 5*b*, a sacrificial layer 161 is deposited on the multi-layered setup shown in FIG. 5*a*, wherein the sacrificial layer also covers a surface of the multi-layered setup to which the counter-structure has already been deposited. In another process step, recesses 166 for the corrugation grooves 106 are exposed by means of etching. During a subsequent photo-technique step, recesses 171 for anti-sticking bumps 172 are exposed by means of etching in the sacrificial layer 161, wherein (not shown here) these recesses 171 for anti-sticking bumps 172 may also be etched in the recesses 166 for the corrugation grooves 106. Subsequently, as is shown in FIG. 5*c*, a membrane structure layer 11 is deposited onto the sacrificial oxide layer 161 so that the membrane structure 11 also fills the recesses 171 for the anti-sticking bumps 172 and the recesses 166 for the corrugation grooves 106, such that the anti-sticking bumps 172 and the corrugation grooves 106 are part of the membrane structure layer 11. Afterwards, the membrane structure 11 is structured in a suitable way in order for its dimensions to enable further process steps.

In particular, the anti-sticking bumps 172 are pointed, preferably pyramidal or acicular hills in the membrane structure 11. With too strong a deflection of the membrane structure 11 in the direction of the counter-structure 16, first the anti-sticking bumps 172 will contact the counter-structure 16. They serve to keep the surface area where the membrane structure 11 and the counter-structure 16 are in contact small and thus to make sticking of the membrane structure 11 to the counter-structure 16 more difficult. This decreases the probability of a destruction of the microphone due to an electrical overvoltage or condensed humidity in the air gap, the evaporation of which, due to the surface tension, would result in sticking to a smooth membrane.

In a subsequent manufacturing step, the sacrificial layer 161 is structured such that, as is illustrated in this embodiment, it partly extends to the edge of the counter-structure 16, but that the counter-structure 16 is exposed partly. This exposing of the counter-structure 16 allows contacting it by means of a contact hole produced in the further steps.

Figure 5D:
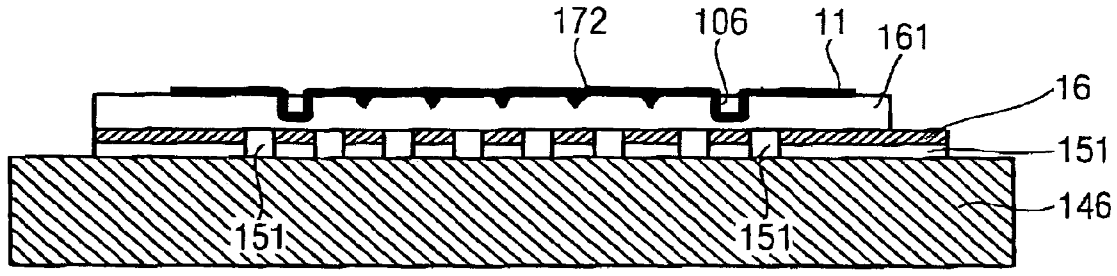

Subsequently an intermediate oxide layer 176 is deposited onto the multi-layered setup of FIG. 5*d*. Through contactings are introduced into the intermediate oxide layer 176, one for a membrane contact hole 181, one for a counter-structure contact hole 186 and one each for the substrate terminal and the guard ring terminal, wherein the through contactings for the substrate terminal and the guard ring terminal are not illustrated here. Electrical contacts, for example made of metallic materials, are deposited onto the intermediate oxide 176 so that the membrane contacting 110 conductively connected to the membrane contact hole 181 is formed and a counter-structure contacting 112 conductively connected to the counter-structure contact hole 186 is formed.

Figure 5E:
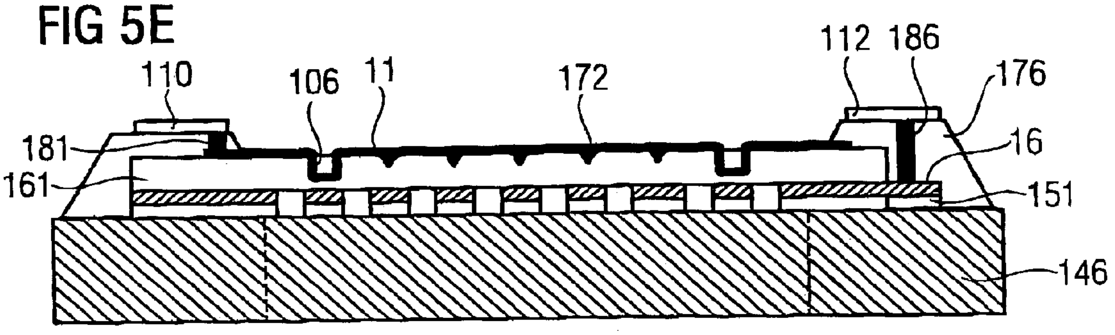

In another process step, the intermediate oxide 176 is removed again from a part of the membrane structure 11, to obtain the multi-layered setup illustrated in FIG. 5*e*.

Figure 5F:
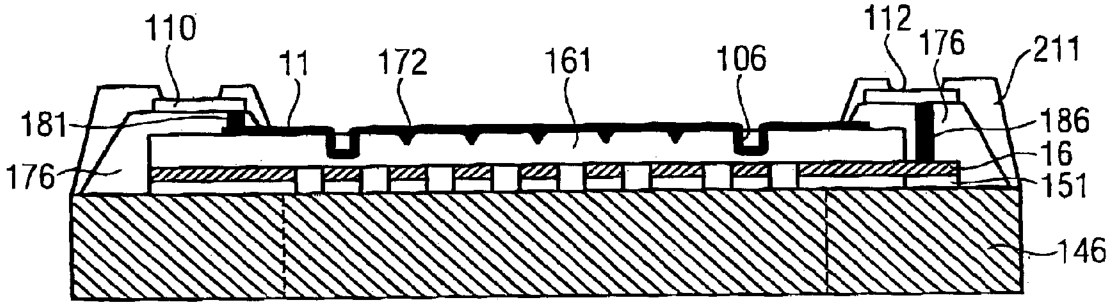

In the next process step, the multi-layered setup of FIG. 5*e* is covered by a protective passivation layer 211 on the surface facing away from the substrate. Afterwards, the protective passivation layer 211 is removed from the membrane structure 11 in the region outside the edge region and a part of the edge region, from a part of the membrane contacting 110 and a part of the counter-structure contacting 112. This removing of the protective passivation layer 211 can, for example, take place in a masked etching process. The multi-layered setup obtained here is illustrated in FIG. 5*f*.

Figure 5G:
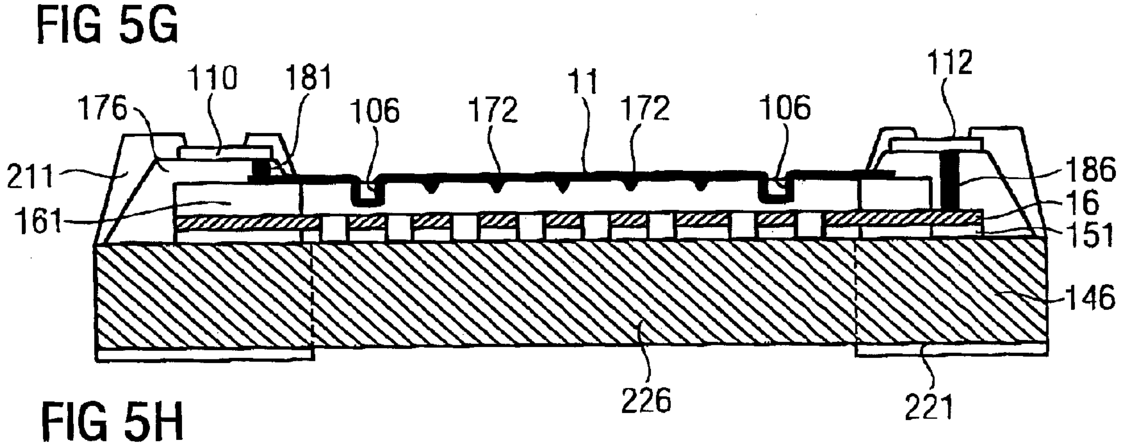

Subsequently, wafers including the chips comprising the multi-layered setup illustrated are thinned. Of course, thinning may also take place with the individual chips, wherein the thinning of wafers is often of advantage for cost reasons. This results in a reduction of the thickness of the substrate 146. Afterwards, a masking layer 221 is deposited onto the surface of the substrate 146 facing away from the membrane structure 11. In another photo-technique step, the masking layer 221 is removed in the areas where the substrate 146 is to be exposed by etching. This removal of the hard mask layer 221 is often also performed by a masked etching process. Subsequently, the substrate 146 is exposed by etching starting from the surface at least partly covered by the hard mask 221 in an anisotropic dry etching method, this etching process stopping at the etch stop layer 151. The substrate 146 consequently comprises a recess 226, the depth of which extend to the etch stop layer 151, in a region not covered by the hard mask 221. The resulting setup is illustrated in FIG. 5*g*. Usually, a photo-resist mask is sufficient for the recess of the substrate 226. The etching process is an anisotropic dry etch process or DRIE (deep reactive ion etch) or the so-called Bosch process.

Figure 5H:
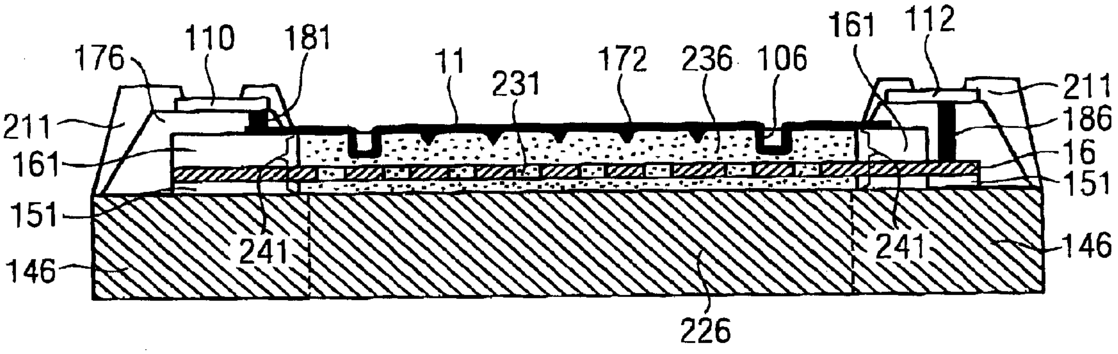

In a subsequent processing step, the etch stop layer 151 is removed within edge region boundaries 241 and, subsequently, the sacrificial layer 161 is exposed by etching within the edge region boundaries 241 through holes 231 in the counter-structure 16. Perforations 231 in the counter-structure 16 and an air gap 236 between the membrane structure 11 and the counter-structure 16 are the result of this. Ideally, the etch stop layer 151 and the sacrificial layer 161 are formed of the same material so that the process of etching the etch stop layer 151 and the sacrificial layer 161 within the edge region boundaries 241 can be united to form a single process step. Subsequently, the multi-layered setup illustrated is subjected to a drying method before the individual chips carrying the microphone device are cut from the wafer. This method step is also referred to as dicing. It is to be pointed out here that the method steps performed in FIGS. 5*a*–*h* may also be performed with individual chips, wherein in this case the step of dicing is performed before the step of etching. The resulting device is illustrated in FIG. 5*h*.

In the above embodiments, the substrate 146 may, for example, be formed as a semiconductor material, such as, for example, silicon. The etch stop layer 151 may, for example, be an oxide layer. The counter-structure and the membrane structure may preferably be formed of the same material, but may also be formed of different materials, wherein the materials employed are preferably good conductors, such as, for example, metallic layers or highly doped semiconductor layers, such as, for example, polysilicon. The sacrificial layer 161 may be formed of any isolating material, such as, for example, in the case of semiconductor substrates, preferably often an oxide, like silicon dioxide. The intermediate oxide layer 176 and the passivation layer 211 may also be formed in any isolating materials, such as, for example, in the case of semiconductor substrates, preferably oxides or nitrides, such as, for example, with silicon, silicon dioxide or silicon nitride.

The setup of a pressure sensor or microphone according to the present invention, illustrated in FIG. 4, may also comprise any shape and the number of recesses may be arbitrarily high. Preferably, however, taking into consideration the structural width in semiconductor technology employed at present and the resulting estimations for dimensions of the microphone, it is between 3 and 20. Furthermore, the recesses may be formed in any shape, it is, however, of advantage to introduce them in an arch shape or angular shape. A guard structure implemented as a guard ring in the above embodiments, serving to shield the counter-structure 16, has the shape of a ring and is closed, but any other geometrical shape which may also not be closed, could be selected as well.

In the above embodiments, the impedance converter 376 is formed as a transistor circuit. Circuits implementing a galvanical separation of the guard ring potential from the potential at the membrane terminal 81 and at the same performing an adjustment of the guard ring potential to the value of the potential of the membrane structure are alternatives. The inverter 431 may alternatively not be formed as a transistor but as any electrical circuit having this function.

In the above embodiments, the protective structure is formed as a guard ring 96 and arranged in the same layer as the counter-structure 16. Arbitrary arrangements of the protective structure or designs in any layers in the pressure sensor are alternatives.

The above embodiments illustrate that a microphone according to an embodiment of the present invention utilizes dry back side etching, such as, for example, DRIE etching, to ensure the minimal chip areas. In contrast to an electrochemical etch stop method employed in conventional chips of the Infineon company, DRIE etching stops, for example, on an oxide layer 151 and thus simplifies this technology enormously. A poly Si membrane 11 and a perforated poly Si counter-electrode 16 are used for this purpose. In order for the parasitic capacities to become minimal, the counter-structure 16 may, for example, also be formed as a net-membrane or electrode. Here, the base capacities may at the same time be limited or trapped by a suitable arrangement. The number of photo techniques is reduced by this mode of operation from 16 to 10 levels compared to an embodiment of a prior art microphone.

Additionally, a net poly Si membrane and a net poly Si counter-electrode may, for example, be arranged in a twisted manner so that the overlapping of the membrane structure 11 and the counter-structure 16 is reduced. With a double poly membrane system for example, this allows a simultaneous shielding of parasitic capacities of the membrane electrode 11.

The above embodiments have shown that the membrane is suspended to the sacrificial layer 161 deposited on the substrate 146 via any number, such as, for example, 15, of lands, wherein the number of lands is preferably between 3 and 20. In the above embodiments of the present invention, the counter-structure has a similar shape to that of the membrane and is perforated with holes in the edge region where there are recesses. Preferably, the guard structure is fixed in the same layer of the counter-structure 16. The guard structure thus is often formed as a guard ring 96, in particular with circular membrane and/or counter-structures 11, 16. Ideally, the membrane structure 11 and the counter-structure 16 only overlap in the active region within the edge region boundaries 21, 26, 56. Preferably, the ends of the membrane lands, i.e. the regions of the membrane structure 11 between the recesses in the membrane structure 11, rest in the region of the guard structure 96, the sacrificial layer 161 being arranged between the guard structure 96 and the membrane structure 11. In this setup, the parasitic capacities are considerably reduced.

The above embodiments according to the present invention may be implemented in squared chips having, for example, a length and a width of 1.4 mm and a thickness of 0.4 mm. The free membrane diameter may in this arrangement be about 1 mm. Thus, a polysilicon membrane with a thickness of 250 nm having anti-sticking bumps 172 and six corrugation grooves 106 may be implemented here. The corrugation grooves, in turn, support the deflection performance of the microphone and thus increase the sensitivity. In this assembly, the membrane structure 11 may, for example, be suspended at 15 lands, mechanically corresponding to 15 springs. The membrane structure 11 may be opposite a counter-structure 16 made of polysilicon having a thickness of 400 nm, which may preferably also be suspended via 15 lands, corresponding to the mechanical performance of 15 springs. The diameters of the perforation holes 231 may, for example, be 5 μm and the counter-structure 16 may comprise a perforation rate of about 30% to allow the manufacturing method to be performed with advantage. A typical value for the spacing between the membrane structure 11 and the counter-structure 16 in this assembly is about 2 μm, which at the same time corresponds to the thickness of the sacrificial layer 151.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A pressure sensor comprising:

a substrate;

a counter-structure applied to the substrate;

a dielectric on the counter-structure;

a membrane on the dielectric, wherein the membrane or the counter-structure is deflectable by a pressure applied;

a protective structure, the protective structure being isolated from the counter-structure and the membrane, the protective structure being arranged with regard to the membrane or the counter-structure such that a capacity forms between the protective structure and the membrane or the protective structure and the counter-structure; and a provider for providing a potential at the protective structure differing from a potential at the counter-structure or the membrane.

2. The pressure sensor according to claim 1, which is formed as a capacitor microphone.

3. The pressure sensor according to claim 1, wherein the membrane or the counter-structure is in an area-overlapping relation to the protective structure.

4. The pressure sensor according to claim 1, wherein the substrate comprises an electrically conducting region.

5. The pressure sensor according to claim 1, wherein the electrically conducting region of the substrate forms a ground potential, wherein a potential of a protective structure, a potential of a membrane and a potential of a counter-structure are related to the ground potential.

6. The pressure sensor according to claim 1, wherein the substrate is electrically isolated from the counter-structure and the membrane.

7. The pressure sensor according to claim 1, wherein the membrane or the counter-structure includes an electrically conducting layer.

8. The pressure sensor according to claim 1, wherein the protective structure in a multi-layered setup is arranged in a same level as the membrane or the counter-structure.

9. The pressure sensor according to claim 8, wherein the recesses in the membrane or the counter-structure form lands and the protective structure overlaps the lands of the membrane or counter-structure not arranged in the same level.

10. The pressure sensor according to claim 8, wherein the protective structure of the membrane or counter-structure arranged in the same level of the multi-layered setup is electrically isolated from the membrane or the counter-structure by a recess.

11. The pressure sensor according to claim 8, wherein the multi-layered setup comprises a layer including the protective structure and the counter-structure or the protective structure and the membrane.

12. The pressure sensor according to claim 1, wherein the protective structure at least partially surrounds the membrane or the counter-structure.

13. The pressure sensor according to claim 1, wherein an electrical potential of a protective structure, in a state of rest, deviates less than 50% from the value of the potential of the counter-structure or the membrane.

14. The pressure sensor according to claim 1, wherein the provider for providing a potential of a protective structure determines a potential at the counter-structure or the membrane and sets a potential at the protective structure depending on the value of the potential.

15. The pressure sensor according to claim 14, wherein the provider for providing a potential at the protective structure sets the potential at the protective structure such that a potential value of the protective structure deviates less than 10% from the value of the potential at the membrane or the counter-structure.

16. The pressure sensor according to claim 15, wherein the protective structure and the membrane or the counter-structure are separated galvanically.

17. The pressure sensor according to claim 14, wherein the provider for providing a potential at the protective structure includes an impedance converter setting the potential on the protective structure via a voltage divider.

18. The pressure sensor according to claim 17, wherein the impedance converter includes a transistor with a potential depending on a potential of the membrane or the counter-structure applied to an input of the transistor and a potential depending on the potential of the protective structure applied to a second input.

19. The pressure sensor according to claim 1, wherein recesses in the membrane or the counter-structure form lands and an area of the protective structure overlaps the lands in the membrane or the counter-structure.

20. A method for operating a pressure sensor, comprising:
- a substrate;
- a counter-structure applied to the substrate;
- a dielectric on the counter-structure;
- a membrane on the dielectric, the membrane or the counter-structure being deflectable by a pressure applied; and
- a protective structure arranged with regard to the membrane such that a capacity forms between the protective structure and the member or the protective structure and the counter-structure;

comprising a step of applying a potential to the protective structure differing from a potential of the counter-structure or the membrane.

* * * * *